(12) United States Patent
Nicholls

(10) Patent No.: US 10,147,519 B2
(45) Date of Patent: Dec. 4, 2018

(54) INSULATING SOCK OF A TRACTION BATTERY

(71) Applicant: JAGUAR LAND ROVER LIMITED, Warwickshire (GB)

(72) Inventor: Stephen Nicholls, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 281 days.

(21) Appl. No.: 14/405,584

(22) PCT Filed: Jun. 7, 2013

(86) PCT No.: PCT/EP2013/061772
§ 371 (c)(1),
(2) Date: Dec. 4, 2014

(87) PCT Pub. No.: WO2013/182672
PCT Pub. Date: Dec. 12, 2013

(65) Prior Publication Data
US 2015/0179304 A1 Jun. 25, 2015

(30) Foreign Application Priority Data
Jun. 7, 2012 (GB) .................................. 1210062.4

(51) Int. Cl.
*H01M 2/20* (2006.01)
*H01B 7/29* (2006.01)
*H01M 2/02* (2006.01)
*H01B 7/295* (2006.01)

(52) U.S. Cl.
CPC ............... *H01B 7/29* (2013.01); *H01B 7/295* (2013.01); *H01M 2/0277* (2013.01); *H01M 2/20* (2013.01); *H01M 2200/00* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 4,731,501 | A | * | 3/1988 | Clark ................... H02G 15/013 174/153 G |
| 4,868,967 | A | * | 9/1989 | Holt .......................... F16L 5/02 29/450 |
| 4,994,317 | A | | 2/1991 | Dugan et al. |
| 5,000,228 | A | | 3/1991 | Manent et al. |

(Continued)

FOREIGN PATENT DOCUMENTS

| | | |
|---|---|---|
| CA | 2294623 A1 | 6/2001 |
| CN | 86104548 | 8/1987 |

(Continued)

OTHER PUBLICATIONS

Combined Search and Examination Report for Application No. GB1210062.4 dated Aug. 6, 2012.

(Continued)

*Primary Examiner* — Scott J. Chmielecki

(57) ABSTRACT

A fire and heat resistant sock for an internal cable of a vehicle traction battery protects both the cable and the exit aperture of the cable. By this means the effect of a fire within the battery casing can be addressed.

19 Claims, 2 Drawing Sheets

(56) References Cited

U.S. PATENT DOCUMENTS

| | | | |
|---|---|---|---|
| 5,421,127 A * | 6/1995 | Stefely | A62C 2/06 137/75 |
| 6,051,795 A | 4/2000 | Fisher et al. | |
| 2002/0155348 A1* | 10/2002 | Gitto | H01M 2/0257 429/163 |
| 2005/0118463 A1 | 6/2005 | Okachi et al. | |
| 2006/0148304 A1* | 7/2006 | Kennedy | H01R 13/405 439/404 |
| 2009/0126989 A1* | 5/2009 | Ford | A62C 3/16 174/491 |
| 2010/0275539 A1 | 11/2010 | Shaw | |
| 2013/0170594 A1* | 7/2013 | Bass | G21D 1/04 376/203 |

FOREIGN PATENT DOCUMENTS

| | | |
|---|---|---|
| CN | 2506006 | 8/2002 |
| CN | 201060707 Y | 5/2008 |
| CN | 101606293 A | 12/2009 |
| CN | 102478434 A | 5/2012 |
| DE | 102009032460 A1 | 1/2011 |
| DE | 102010007046 A1 | 8/2011 |
| EP | 0209399 A2 | 1/1987 |
| GB | 1346578 | 2/1974 |
| GB | 2213981 A | 8/1989 |
| GB | 2241306 A | 8/1991 |
| KR | 20120004063 A | 1/2012 |
| WO | 2010063284 A2 | 6/2010 |
| WO | 2011/130049 A2 | 10/2011 |

OTHER PUBLICATIONS

International Search Report for International Application No. PCT/EP2013/061772 dated Nov. 21, 2013.

Search Report issued by the Patent Office of the People's Republic of China for Application No. CN 201380036525.4 dated Jun. 29, 2016.

Patent Office of the People's Republic of China, Supplementary Search Report, Application No. 201380036525.4 dated Jan. 23, 2017.

The Supplementary Search Report for CN Application No. 201380036525.4, dated Apr. 12, 2017.

* cited by examiner

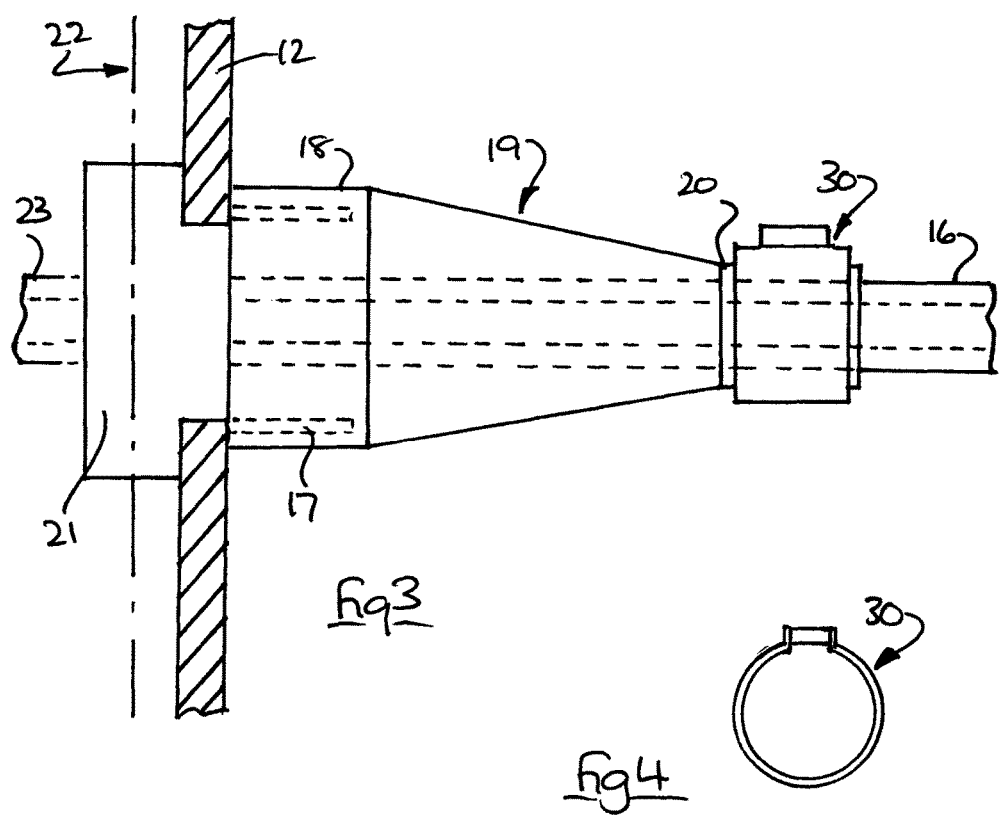

INSULATING SOCK OF A TRACTION BATTERY

FIELD OF THE INVENTION

This invention relates to an insulating sock for traction batteries for electric and hybrid vehicles, in particular, but not exclusively, traction batteries having a high energy density. Aspects of the invention relate to a sock, to a device and to a vehicle.

BACKGROUND OF THE INVENTION

Electric and hybrid vehicles have become more common due to the availability of traction batteries with high energy density, for example using lithium-ion technology. Such batteries are also generally characterized by relatively low weight, but relatively high operating voltage. In a hybrid vehicle the traction battery may be used to assist an internal combustion engine in order to boost acceleration.

A traction battery of a vehicle is generally confined within a casing, but necessarily connections through the casing are required, for example for electric cables. Such cables may convey traction current, charging current, or control signals. Electric cables generally consist of a conductor (e.g. copper) surrounded by an insulating material of plastic or the like, and are required to be flexible.

The potential high energy density of a traction battery generally requires careful monitoring and management in order to ensure safe reliable operation thereof. However in the event of catastrophic damage, for example in a vehicle collision, there is a possibility that control systems may become damaged, or that the safety of the traction battery may be otherwise compromised. Generally speaking, failure is characterized by an increase in battery temperature above the normal maximum of about 50-70° C.

In the event of catastrophic damage of a traction battery, the internal temperature thereof may rise substantially, and exceed the melting temperature of a cable insulator. The loss of insulator may allow the battery casing to be breached, subjecting vehicle components around the battery casing to this high temperature, and in turn causing further potential damage to the vehicle. In particular a connector at the wall of the battery casing may be exposed to high temperatures and, if damaged may provide a significant breach of the battery casing.

What is required is a means of inhibiting a breach of the battery casing due to softening or melting of the insulation of an electrical cable of the battery, or of the materials of an electrical connector at the casing boundary.

SUMMARY OF THE INVENTION

According to one aspect of the invention, there is provided an open-ended fire resistant sock for an insulated flexible cable of a traction battery, the sock comprising a tube having one end aperture smaller than the other end aperture, said one end aperture being adapted for close engagement about the insulation sheath of an electrical cable or the insulation sheaths of a bundle of electrical cables, and said other end being adapted for close engagement with the periphery of an aperture of a traction battery casing. A cable may be single or multi core.

In one embodiment the sock engages about a continuous inwardly directed flange of a battery casing aperture, which may be circular. The flange may be sized and/or shaped to accommodate an electrical connector within the sheath in use.

In one embodiment the sock has cylindrical tubular portions at each end, and may be tapered inwardly away from the inner wall of casing. The taper provides an air space about the cable which increases in the direction of the wall of the battery casing and provides for additional heat insulation.

The sock of embodiments of the invention protects components external to the battery casing from heat and fire within the casing, and may also give additional protection to the interior of the casing from external heat and fire in the vicinity of the cable aperture.

The invention also comprises a battery casing incorporating the fire resistant sock, and a vehicle incorporating such a casing.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described with reference to one embodiment are applicable to all embodiments, unless such features are incompatible.

BRIEF DESCRIPTION OF THE DRAWINGS

Embodiments of the invention will now be described, by way of example only, with reference to the accompanying drawings, in which:

FIG. 3 is a part axial section through a coupled sock in a battery casing; and

FIG. 4 shows a temperature responsive clamp of the sock.

DETAILED DESCRIPTION

Figure 1:
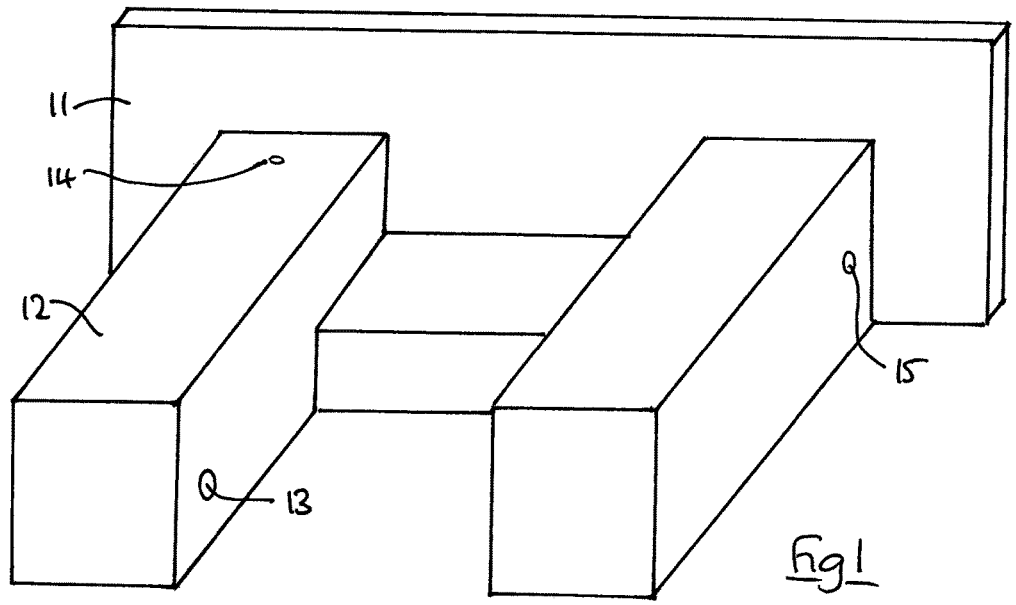
FIG. 1 is a schematic perspective view of a vehicle traction battery.

With reference to the drawings, FIG. 1 illustrates schematically a rear bulkhead 11 of a vehicle, ahead of which is a passenger compartment (not shown). Behind the bulkhead 11 is a generally 'U' shaped traction battery contained in a casing 12. A space between the rear facing limbs of the casing 12 may contain an internal combustion engine (not shown); transmission elements and a rear axle are arranged to the rear of the casing 12. The arrangement of FIG. 1 is one example of a distributed traction battery of a vehicle; other configurations are of course possible.

Also illustrated in FIG. 1 are typical entry/exit locations 13-15 for insulated electric cables connecting the battery of the vehicle in use. Other locations are of course possible depending on the location of related components about the vehicle structure. To ensure compact packaging of the vehicle components, the casing may be in close proximity to, for example, a fuel tank of the vehicle.

Figure 2:
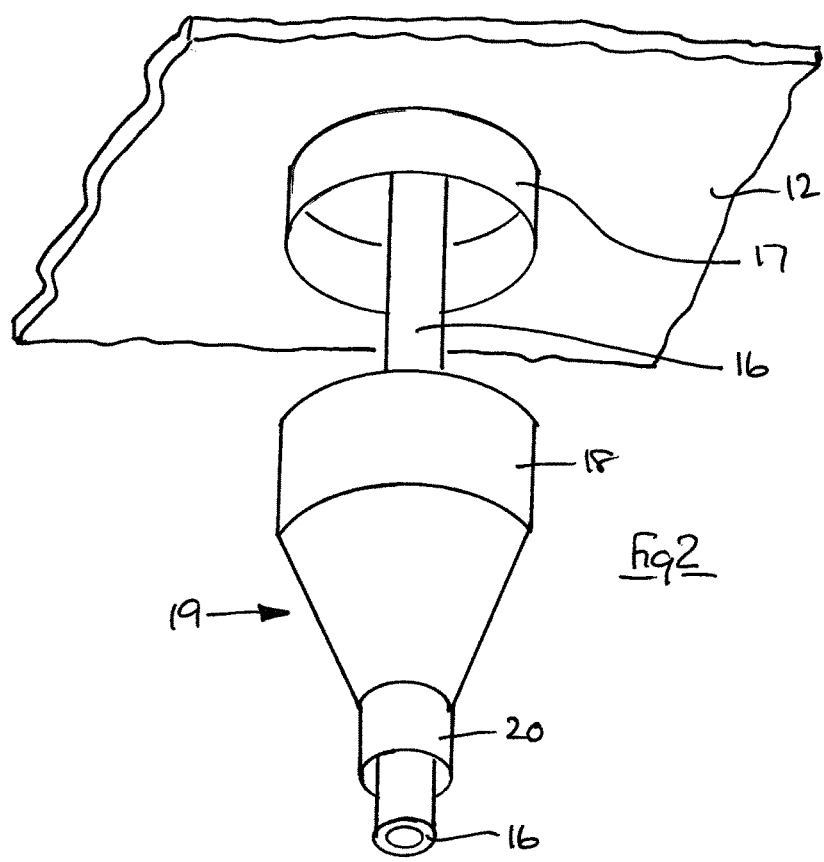
FIG. 2 is a part-sectional isometric view of the sock according to an embodiment of the invention, in situ, prior to coupling thereof.

FIGS. 2 and 3 illustrate the invention. The battery casing 12 comprises a wall within which one or more apertures are defined to accommodate insulated flexible cables. FIG. 2 illustrates a single core cable 16, though multiple individually insulated cables may be bundled together. On the inside the casing is provided with an annular projection 17 about which is closely engaged a plain tubular end 18 of a flexible sock 19. The sock tapers to a smaller diameter plain tubular end 20 which constitutes an entry/exit point for the cable 16.

As illustrated in FIG. 4, the sock may include an external clamp 30 around the tubular end 20 to ensure close engagement of the sock and cable. A clamp (not shown) may also be provided at the tubular end 18.

An electrical connector 21, of any suitable kind may be provided at the casing aperture in order to allow electrical disconnection of the battery from the vehicle. As illustrated in FIG. 3, the connector is external and spigoted into the aperture—other configurations are possible. The split line of the connector is represented by chain-dot line 22, and also illustrated is a portion 23 electrical cable which connects to other vehicle systems. The connector 21 may be resistant to heat, but the manufacturing materials thereof, in particular the moulded body, are generally not tolerant of temperatures in excess of 200° C.

The flexible sock 19 is of a woven, knitted or braided construction so as to permit flexibility in use, and is manufactured of a heat and fire resistant material such as silica fibre, e.g. $SiO_2$. In one example the sock has a maximum external diameter of 35-50 mm, and a length of 100-200 mm, though lesser dimensions are of course possible. Any construction technique may be adopted for the sock provided that flexibility is at least as great as the cable therein. Thus the cable and sock may curl or otherwise change shape so as to fit within a suitable space within the casing, when closed.

In the event of excessive heat within the battery casing 12, which could for example soften or melt insulation of the cable 16 or of the plastic parts of the connector 21, the sock provides thermal protection of the enclosed cable, and in particular the region of the casing aperture. A sock of silica fibre may for example provide substantial protection to the connector 21 from temperatures exceeding 1500° C. for a period of 10 minutes or more. By this means the casing aperture may be protected from a breach whilst other measures are taken to deal with the source of excessive temperature—for example by permitting controlled venting of hot gas to a safe region of the vehicle and/or the deployment of fire suppression agents.

The tapered construction of the sock allows the creation of an air barrier between the sock and the cable/connector, thus further enhancing heat insulation. The length of the sock ensures that any heat or flame entering the tubular end 20, due for example to degradation of the cable insulating material, is somewhat distant from the casing aperture and connector 21 and thus less likely to cause immediate failure thereof.

Other means of connecting the sock to the casing are possible, and the example shown is merely illustrative.

The clamp 30 may comprise an incomplete resilient metal band having a distance piece 31 of any suitable kind to determine the closed internal diameter thereof. In use the free ends of the band are moved apart to permit fitting about the sock, and the clamp then closes to the extent permitted by the distance piece. This arrangement avoids excessive clamping force on the resilient insulator of the cable 16.

In one embodiment the distance piece is temperature responsive, so that a substantial increase in temperature within the casing causes the clamp to grip the cable more tightly, thus compensating for potential softening or melting of the insulation of the cable.

The distance piece may for example be of plastic or of a low melting point metal. Alternatively the band may comprise a suitable bi-metallic element or other temperature responsive device. It will be understood that the clamp 30 can take the form of any suitable spring ring, such as a hose clamp or the like, and be manufactured of the required dimensions and materials to give the necessary residual clamping force.

Variants and alternatives are possible within the scope of the claims appended hereto.

The invention claimed is:

1. An electrical energy storage device of a vehicle, said device comprising a casing, a traction battery of the vehicle and an insulated electrical cable in the casing, an aperture of the casing associated with said cable and a fire resistant sock provided within the casing,
   wherein the sock is made from a fire resistant fibre and comprises a tube having a first end including a first aperture and a second end including a second aperture, the first aperture is smaller than the second aperture, the first aperture closely engaging an insulation sheath of the insulated electrical cable within the casing or the insulation sheaths of a bundle of electrical cables within the casing, and said second end being adapted for close engagement with the periphery of the aperture of the casing.

2. An electrical energy storage device according to claim 1, wherein the sock comprises a cylindrical tubular portion near one of the ends.

3. An electrical energy storage device according to claim 2, wherein both of the ends of the sock are tubular and cylindrical.

4. An electrical energy storage device according to claim 2, wherein each of the ends of the sock comprises a cylindrical tubular portion and there is a tapering internal diameter between said portions.

5. An electrical energy storage device according to claim 1, wherein said second aperture has an area that is at least twice an area of the first aperture.

6. An electrical energy storage device according to claim 1, wherein the sock has an axial length at least twice the maximum transverse dimension thereof, in use.

7. An electrical energy storage device according to claim 1, wherein the sock is woven from the fire resistant fibre.

8. An electrical energy storage device according to claim 7, wherein said fibre comprises silica.

9. A device according to claim 1, wherein said aperture of the casing is circular and defined by an annulus projecting internally of the casing.

10. A device according to claim 9, and further including a clamp ring to retain said sock on said annulus.

11. A device according to claim 1, and further including a resilient clamp to urge said first aperture of the sock against the insulated sheath of said cable.

12. A device according to claim 11, wherein said resilient clamp is substantially circular and includes a temperature sensitive element maintaining said clamp at a first diameter, but permitting said clamp to adopt a smaller second diameter above a predetermined temperature.

13. A device according to claim 12, wherein said predetermined temperature is substantially equal to the softening temperature of the insulated sheath of said cable.

14. A vehicle incorporating the device of claim 1.

15. An electrical energy storage device according to claim 1, wherein said first aperture and said second aperture each have a preset dimension when the apertures are unoccupied such that said first aperture is smaller than said second aperture.

16. An electrical energy storage device according to claim 1, wherein said first aperture is formed smaller than said second aperture when said apertures are unoccupied.

17. A device according to claim 1, wherein a tapered construction of the sock provides an air barrier between a portion of the sock and the cable.

18. A device according to claim 1, comprising an external connector provided at the aperture of the casing.

19. A device according to claim 18, wherein the external connector is spigoted into the aperture of the casing.

\* \* \* \* \*